April 22, 1930.　　　　　F. B. LOMAX　　　　　1,755,482
FILTER
Filed Nov. 21, 1927　　　2 Sheets-Sheet 1
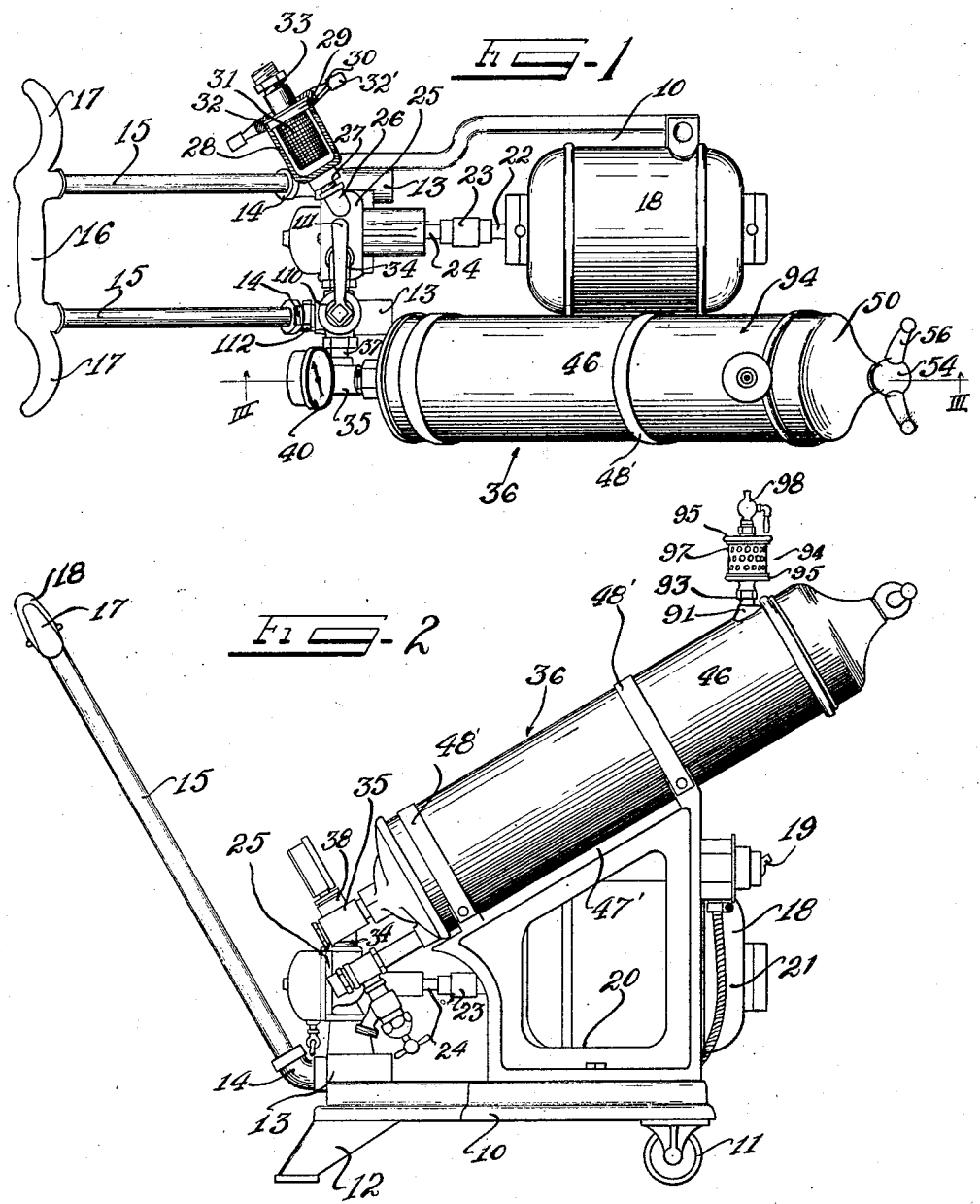

April 22, 1930.   F. B. LOMAX   1,755,482
FILTER
Filed Nov. 21, 1927   2 Sheets-Sheet 2
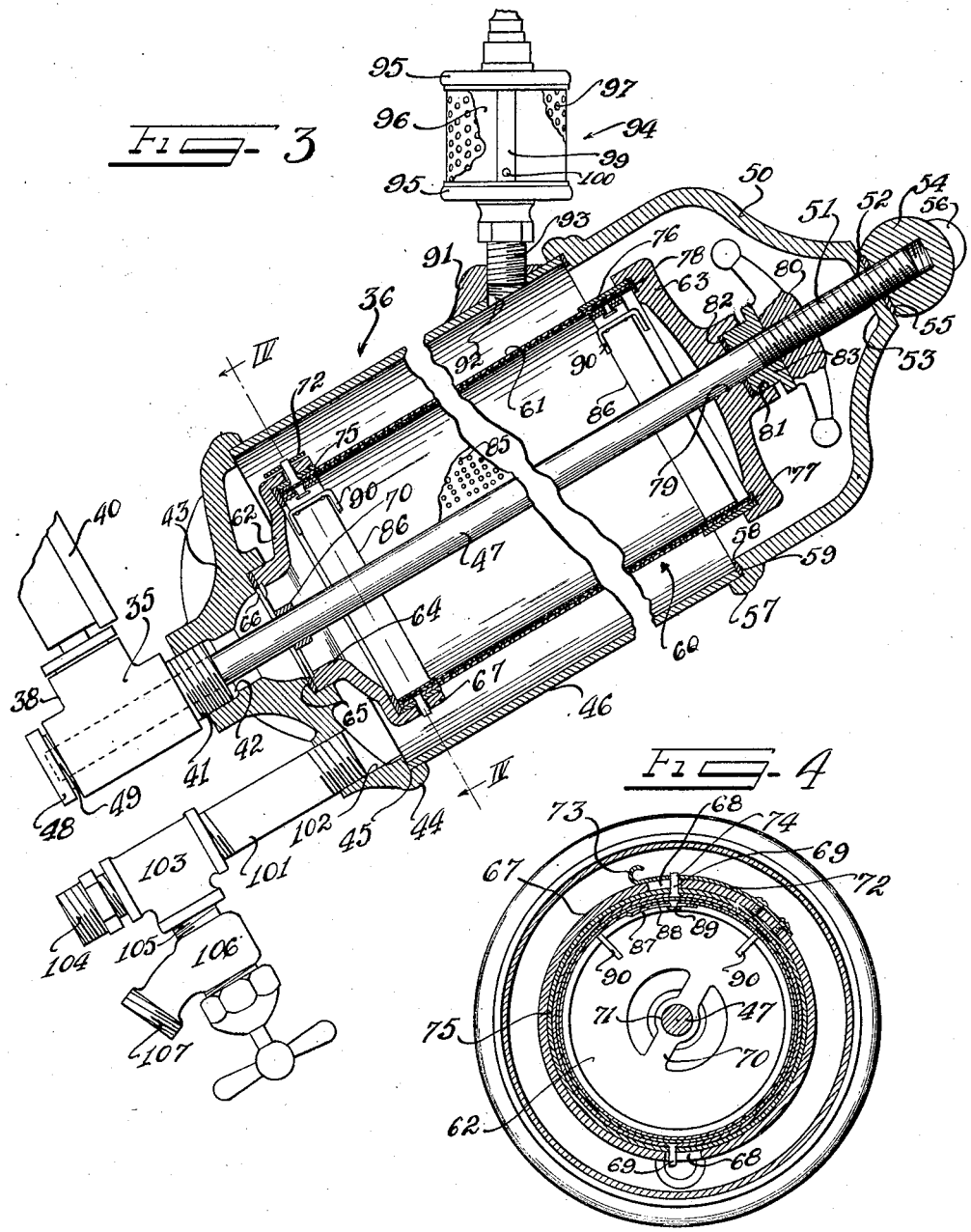

Patented Apr. 22, 1930

1,755,482

UNITED STATES PATENT OFFICE

FRANK B. LOMAX, OF CHICAGO, ILLINOIS

FILTER

Application filed November 21, 1927. Serial No. 234,658.

My present invention relates in general to filtering apparatus, and more particularly to an improved pressure filter especially adapted for use in the filtering of syrups and other analogous solutions used in the making of beverages and the like.

An object of my invention is to provide an improved pressure filter of simple and inexpensive construction.

Another object of my invention is to provide an improved pressure filter of such a construction that it is self-draining.

Another object of the invention resides in the provision of a highly simple filter including guide means whereby the filter may be assembled with facility, and whereby the filtering material can be replaced with facility.

Still another object of my invention resides in the provision of an internal pressure filter of a compact construction, and yet at the same time affording a considerably greater filtering surface than any filter of the same size now available on the market.

Another and further object of the invention is the provision of a filter including control means for enabling the manual control of the air pressure existing within the filter.

A still further object of the invention resides in the provision of a filter wherein liquid is forced outwardly through the wall of a cylindrical filtering barrier.

A still further object of the invention resides in the provision of a portable filter arranged and balanced in such a manner that the same may be tilted over the axis of a single pair of wheels connected thereto, whereby the filter may be rolled to any desired position with facility.

Still another object of the invention resides in the provision of novel means for mounting and sealing a cylindrical filtering barrier within a cylindrical tank.

Other objects and advantages of my invention will more fully appear from the following detailed description taken in connection with the accompanying drawings, which illustrate a single embodiment thereof and in which:

Figure 1 is a plan view of my novel portable filter;

Figure 2 is a side elevation of the filter shown in Figure 1;

Figure 3 is a fragmentary sectional view partly in elevation taken on substantially the line III—III of Figure 1 looking upwardly and showing in detail the construction of and mounting for the cylindrical filter within the cylindrical tank, and Figure 4 is a cross-sectional view taken on substantially the line IV—IV of Figure 3 looking in the direction indicated by the arrows.

In the drawings:

Like reference characters designate similar parts throughout the several views.

The reference character 10 designates generally a base which has connected to its underside at one end a pair of wheels 11, by means of which the filter, as will be more fully explained hereinafter, can be rolled from place to place. Connected to the underside of the base 10 at its other end is a downwardly extending leg or bracket 12 adapted to normally engage the top of the floor, whereby the base 10 can be maintained in a true horizontal position. Connected to the top of the base 10 are a pair of spaced blocks 13, to each of which is secured a laterally extending pipe elbow 14 having a suitable internal thread. Threaded into each of these elbows 14 is an upwardly extending diagonal pipe-like rod 15. The upper ends of these spaced diagonal rods 15 are rigidly connected together by means of a handle member 16 having formed integral with its ends a pair of arcuate arms 17 by means of which the handle may be moved upwardly. It will be noted that the connections between the rods 15 and the base 10 are directly over the leg 12, so that by moving upwardly on the handle member 16, it is possible to tilt the entire machine about the axis of the wheels 11, whereby the machine can be rolled to the desired place. Moreover, attention is directed to the fact that when the machine is in its tilted position, it will be balanced relative to the axis of the two wheels 11.

Mounted upon and secured to the top of the base 10 is a conventional electric motor 18, which may be controlled by a suitable switch 19 secured to a bracket 20 rigidly fastened to the top of the base 10. An electrical conduit 21 extends from the switch 19 to the motor 18. The motor 18 includes an armature shaft 22, which is connected by means of a conventional coupling 23 to a shaft 24 of a rotary pump 25 secured to the top of the base 10 adjacent the blocks 13.

Extending from the pump 25 is an inlet pipe 26 which has threaded into it a pipe section 27. Formed integral with the pipe section 27 is a cup-like member 28, one end of which is formed open. Fitted into this open end of the cup 28 is a ring-like element 29 which is seated on a shoulder 30 formed in this open end of the cup member 28. The ring member 29 has secured to it a cylindrical screen 31 extending into the cup member 28. The ring element 29 is held in place on the shoulder 30 by means of a clamping member 32 threaded on the upper end of the cup member 28. This clamp member 32 includes a pair of diametrically opposed arms 32', by means of which the same may be screwed upon the upper end of cup member 28. Disposed in communication with ring element 29 and secured thereto is a pipe fitting 33 adapted to be connected to the source of liquid to be filtered. It will be evident that the screen 31 will serve to sieve the liquid before the liquid is allowed to enter the pump 25, thus preventing any foreign matter, such as nails, string, or the like, from getting into the pump and doing damage thereto. Then, too, the mounting shown for the screen 31 is such that the screen may be readily removed from the cup member whenever it is desired to clean the same.

The pump has also connected to it an outlet 34, which is connected to an angular pipe fitting 35 secured to and in communication with a cylindrical tank 36. The fitting 35 includes a lateral arm 37 (Figure 1) connected to the outlet 34 of the pump. Extending upwardly from the fitting 35 is a lateral arm 38 disposed at right angles to arm 37 and having rigidly fastened to it a pressure filter 40 of conventional construction for measuring the pressure of the liquid leaving the pump and entering fitting 35.

The fitting 35 has formed integral with one end of it a threaded portion 41 threaded into an opening 42 (Figure 3) of the bottom member 43 of tank 36. The bottom member 43 is annular in form and its opening 42 is disposed in the center thereof. The member 43 includes a peripheral rim 44 having formed in it an annular shoulder 45 on which is seated the lower end of a sleeve 46 comprising the outer wall of the tank 36. The sleeve 46 is disposed parallel to and mounted upon the slanting top edge 47' (Figure 2) of the bracket 20. This sleeve 46 is secured to the bracket 20 by means of a plurality of steel circular bands 48', which as shown in Figures 1 and 2 may be two in number, and which have their ends secured to the opposite sides of the bracket 20. This lower end of the sleeve 46 is rigidly anchored in place on the shoulder 45 by means of solder or the like. At this time attention is directed to the fact that the tank 36 including its metallic sleeve 46 is disposed in a slanting position, as best shown in Figure 2. By slanting the tank 36, I find that the tank will be self-draining, and then, too, it facilitates the assembly of the filtering barrier in the tank, as will become more fully apparent with the progress of the present description. Extending through the sleeve 46 and disposed concentric therewith is a central and guide rod 47, the lower end of which is provided with a head 48 and an enlarged threaded shank 49 screwed into one end of fitting 35. This rod extends upwardly from fitting 35 through the opening 42 in member 43 and clear through sleeve 46.

The upper end of the rod 47 extends through a top closure member 50 for the tank 36. This upper end of the rod 47, as indicated at 51, is threaded and extends through an opening 52 in the flat top 53 of closure member 50. Threaded upon this end 51 of rod 47 is a large wing nut 54, between which and the top 53 of closure member 50 is a washer 55. The wing nut 54 includes lateral arms 56, by means of which the same may be turned.

The closure member 50 includes a peripheral rim 57 having formed in it an internal shoulder 58 on which is disposed a rubber washer 59. This shoulder 58 is adapted to be engaged by the upper end of the sleeve 46. Moreover, by turning the wing nut 54, it is possible to firmly clamp the closure member 50 to the upper end of this sleeve 46. The washer 59 serves to form a seal to prevent leakage from the tank.

Positioned within the tank 36 is a unitary cylindrical filtering barrier adapted to be removed with facility from the tank when it is desired to change the filtering medium. This barrier, which is designated generally by the reference character 60, has a high degree of simplicity and embodies the most important features of my present machine. The barrier 60 includes a perforated tube 61 and a pair of end members 62 and 63. The lower end member 62 is annular in shape and includes a hollow hub portion 64 abutting a shoulder 65 formed in member 43. A rubber washer 66 is disposed on shoulder 65 between the shoulder and the end of hub portion 64 and serves as a seal.

The end member 62 also includes an annular rim 67 in which one end of the cylinder 61 is fitted. This rim 67 is provided with a pair of diametrically opposed bayonet slots 68 (Figure 4) adapted to receive pins 69 formed integral with one end of the perforated tube 61. This pin and bayonet slot construction permits of the members 62 being removed with the tube 61 from the tank 36. The tubular hub portion 64 of member 62 has formed integral with it a bridge element 70, including an opening 71 (Figure 4), through which the rod 47 extends. This bridge element serves as a guide for the mounting of the end member 62 upon the central rod 47. In other words, the filtering barrier 60 can be with facility slid into the tank 36 on the guide rod 47, which functions to properly align the barrier with the lower end of the tank and also serves to maintain the barrier in a concentric position relative to the tank.

In order to lock the member 62 to the lower end of the tube 61, I secure a spring element 72 to the outer periphery of the rim 67 of member 62 (Figure 4). This spring 72 has formed integral with its loose end a turned hub portion 73, by means of which the same may be flexed away from the member 62. Also it will be noted that this end of the spring element has an opening 74 through which one of the pins 69 is adapted to extend. It will be evident that when this pin 69 is thus engaged by the spring element 72, it is impossible to disconnect the tube from the member 62. On the other hand, when it is desired to disconnect the tube from member 62, it is necessary to flex the element 72 away from the rim 67, so that the pins can be moved out of the bayonet slots 68. Attention is also directed to the fact that a circular strip of metal 75 (Figures 3 and 4) is secured to the lower end of tube 61 and is disposed between the rim 67 of member 62 and the lower end of tube 61.

The upper end of tube 61 has secured to its outer periphery an annular strip of metal 76. This end of the tube extends into a recessed portion formed in top member 63 and engages a rubber washer 77 disposed on a shoulder 78 formed in member 63. The member 63 includes a central opening 79 through which the guide rod 47 extends. This member 63 is forced into tight engagement with the upper end of tube 61 by means of a wing nut 80 threaded on the end 51 of rod 47. It will be noted that one end of the opening 79 in member 63 is countersunk, so as to provide a recess 81 in which is disposed a rubber washer 82. A ring member 83 is disposed between the washer and the wing nut 80. This member 83 is adapted to be forced into the recess 81 by the rotation of wing nut 80, whereby the top end member 63 may be tightly clamped to the upper end of tube 61.

Disposed on and covering the inner periphery of the perforated tube 61 is a sheet of filter paper 85. As will more fully appear with the progress of the present description, this filter paper 85 is adapted to be forced into the perforations of tube 61 by the pressure of the incoming liquid, whereby it will be frictionally bound to the perforated tube or screen. Now during the operation of the filter, a filter bed of magnesium or other filtering material might be built up on the inner surface of this filter paper 85. As long as the paper is subjected to the pressure of the incoming liquid, it will be frictionally secured to the screen or tube 61. However, upon the filter paper being relieved of the pressure of the incoming liquid, the built up filter bed will tend to cause the filter paper to sag between its ends. This is particularly true if the screen or tube 61 is relatively long. In a shorter screen 61, I do not find that the filter paper sags to any extent sufficient to be of any material consequence. However, in a longer length of filtering paper, such as that illustrated in the drawings of the present invention, I find it desirable to hold the ends of the filter paper 85 in place in the tube 61 by means of two clamp members 86—86. Since these two clamp members are identical in construction, it is thought that a description of one will suffice for both.

Each clamp 86 comprises a strip of metal arranged into a circular shape. One end 87 of this strip, as shown in Figure 4, is offset with respect to the other end of the strip, so as to enable it to overlap the other end of the strip. This offset end 87 is provided with an elongated slot 88 through which extends a pin 89 secured to the other end of the strip. Secured to the metal strip comprising clamp 86 adjacent its ends are a pair of opposed U-shaped clips 90—90. It will be evident that by drawing these clips 90—90 toward each other it will be possible to reduce the diameter of the clamp 86, so that it can be withdrawn from the tube 61. This feature is possible due to the pin and slot connection between the ends of the strip comprising the clamp. When these clamps 86 are positioned within the tube 61, they will, due to their own natural resiliency, force the filter paper 85 into tight engagement with the surface of the inner wall of the tube 61.

The top of the sleeve 46 has secured to it a bead of metal 91, which cooperates with the wall of the sleeve 46 to define a threaded opening 92. Threaded into this opening 92 is a pipe section 93, which has secured to its upper end a vertical visual liquid gauge 94. The gauge 94 includes a pair of end members 95—95 connected by a glass cylinder 96 covered by a perforated sleeve or guard 97. Secured to the top members 95 is a manually operable valve 98 (Figure 2) disposed in communication with the interior of cylinder 95. By operating this valve, as will be more fully explained hereinafter, it is possible to allow the displaced air in the filter to escape from the tank 36, thus permitting of an external control of the pressure existing within the tank. Obviously, by relieving the tank of excessive internal air pressure, it is possible to minimize the resistance afforded to the incoming liquid. The pipe section 93 is disposed in communication with a vertical pipe 99 having a small opening 100 in its lower end affording communication between the interior of glass cylinder 96 and pipe 93. It will be evident that the operator of the filter can tell when a sufficient amount of the air in said tank has been displaced by the rising of the liquid in the cylinder 96 of gauge 94. The remaining air in said tank will be compressed to a slight degree by the incoming liquid under pressure. This compressed air will to a certain extent augment the draining of the tank when the pump has been rendered inoperative.

The lower end of the tank 36 has connected to it a discharge pipe 101. The upper end of this pipe 101 is threaded into an opening 102 formed in member 43. The other end of the pipe 101 is connected to a pipe T 103. Threaded into one opening of the pipe T 103 is a nipple 104, which may be connected to the container or machine to which the filtered liquid is to be delivered. The other branch of the T 103 has connected to it the inlet 105 of a hand valve 106, including a discharge orifice 107. This hand valve 106 enables the filtered liquid to be withdrawn at the filter for the purpose of sampling and testing the same. Attention is also directed to the fact that a three-way valve 110 (Figure 1), including a handle 111, is positioned between the discharge 34 of the pump 25 and the fitting 35 connected to the lower end of tank 36. This valve 110 includes a discharge pipe 112 by means of which the liquid can be withdrawn directly from the pump 25 prior to its entering the filter tank 36. This arrangement enables the use of the pump 25 independently of the filter, whenever it is desired to pump liquid without filtering the liquid. That is to say, by turning the handle 111, it is possible to either cause the liquid discharged from the pump 25 to enter the filter tank 36, or to be delivered at some remote point without the necessity of passing through the filter tank 36.

The assembling and operation of my novel filter is briefly as follows:

It will, of course, be evident that the first thing to be done is to place a sheet of filter paper 85 on the inner surface of the perforated tube 61. The next step is to place the clamps 86 in position, so that the paper is firmly secured to the tube 61. Thereafter, the lower end of the tube 61 is rigidly secured to the end member 62 by means of the pins 69 and the bayonet slots 68, previously described in detail. The member 62 is then slid downwardly on the rod 47, the rod extending through the opening 71 in the bridge 70 of member 62, which bridge serves as a guide to insure the proper alignment of member 62 with the end member 43 of the tank. Subsequently, the top end member 63 is slid downwardly on the rod 47 into cooperation with the upper end of the tube 61. This member is firmly clamped to the tube 61 by the wing nut 80, as previously described. The cover or closure member 50 is then firmly clamped to the upper end of the sleeve 46 of tank 36 by means of the wing nut 54. Now it will be evident that due to the seals associated with the ends of the perforated tube 61, any liquid entering the member 43 must pass through the filter paper and the perforated tube before it can be discharged into the space between the sleeve 46 and the tube 61.

The filter tank is now in a condition to perform the filtering operation. After the pump 25 has been started, it will pump liquid into the fitting 35 and from the fitting into the interior of tube 61. As the liquid is forced into the tube 61, it will build up a filter bed on the inner surface of the filter paper 85 covering the inner surface of the tube. Magnesium or any other analogous filtering material may be placed in the liquid to be filtered, so as to enable a filter bed to be built up in tube 61, such as is well known in the filtering art. The incoming liquid will, of course, displace the air in the filtering tank 36. This air will escape into the gauge 94 and may be liberated from the filter tank by operating the small valve 98 connected to the upper end of the gauge 94. When substantially all of the air has been forced from the tank, the liquid will begin to rise in the gauge 94. The operator can then close the valve 98.

Now it will, of course, be evident that the pressure of the incoming liquid entering tube 61 will result in the liquid being forced through the filtering barrier comprising the built up filter bed on the filter paper, and through the perforations in the tube 61 into the space between the tube 61 and the sleeve 46. Moreover, it is to be noted that even though a relatively high pressure exists within the perforated tube 61, I find that the pressure in the space between the sleeve 46 and the tube 61 will be many times less, due to the resistance afforded to the flow of liquid by the filtering barrier. The resistance of this filtering barrier is so great that it insures a thorough filtering of the liquid being pumped. Moreover, it is to be noted that this cylindrical filtering tube affords a relatively great filtering area to the incoming liquid. The liquid, after it has been filtered, leaves the sleeve 46 and is discharged into the pipeline 101 (Figure 3). This filtered liquid, as previously described, may be delivered directly to a container through the pipe 101, or it may be withdrawn through the valve 106 at the machine.

As previously pointed out, the filtering machine is portable. By pushing upwardly on the end portions 17 of handle member 16, it is possible to raise the leg 12 off of the floor, so that the weight of the machine is thrown upon the two wheels 11. I find that by tilting the machine only a slight degree, the weight of it will be equally distributed relative to the axis of the wheels 11, so that the machine can be rolled from place to place with relatively little effort.

From the foregoing it will be evident that the use of a slanting tank in my filter is advantageous in several respects. In the first place, this arrangement results in a self-draining tank as well as greatly facilitates the draining of the same. Secondly, the use of a slanting tank facilitates the lowering of and the removal of the filtering barrier into and out of the tank 36. In the third place, as I have explained above, the slanting tank permits of a portable machine which may be readily balanced over the axis of wheels 11 to facilitate the rolling of the machine from place to place. Lastly, the slanting of the tank increases the efficiency of the filter and its pump since less pressure is required to pump a liquid up an incline than upwardly into a vertical tank.

Now, of course, it is to be understood that although I have illustrated and described in detail the preferred form of my invention, the invention is not to be thus limited, but only in so far as defined by the scope and spirit of the appended claims.

I claim as my invention:

1. In combination, a filter container, a cylindrical filtering barrier in said container, means for supporting said container in a rigid slanting position, an inlet connected to the lower end of the container, an outlet connected to the lower end of the container, and means for forcing liquid through said inlet and through the wall of said barrier into said container, said filtered liquid entering the container being free to gravitate into said outlet.

2. In combination, a filter container, means for supporting said container in a rigid slanting position, a cylindrical filtering barrier in said container, means for forcing liquid upwardly into the interior of the barrier and through the barrier into said container and an outlet connected to the lower end of said container.

3. In combination, a filter container, a cylindrical filtering barrier in said container, means for supporting said container in a rigid slanting position, an inlet connected to the lower end of the container, an outlet connected to the lower end of the container, and means for forcing liquid through said inlet and through the wall of said barrier into said container, said filtered liquid entering the container being free to gravitate into said outlet, said filtering barrier being disposed in said container in a position parallel to the axis of the container and having its interior disposed in communication with said inlet.

4. In combination, a filter container, a cylindrical filtering barrier in said container including a perforated sleeve comprising a screen and a layer of filtering material disposed over the inner surface of said screen, resilient means disposed within said screen and cooperable with an end thereof to maintain said layer of filtering material in engagement therewith, and means for forcing liquid into the interior of the barrier and through the barrier into said container, said resilient means comprising a strip of material arranged into an annular form and having its ends slidably connected to each other, whereby this annular strip is at all times urged outwardly into frictional engagement with the layer of filtering material.

5. In combination, a slanting cylindrical filter container, a slanting cylindrical filtering barrier disposed within and substantially concentric with said container leaving an annular space between its outer surface and the inner surface of said container, an inlet connected to the interior of said filtering barrier, an outlet connected to said annular space, means for sealing the ends of said filtering barrier from communication with said annular space, and means for forcing liquid upwardly into the interior of said barrier and through the barrier into said annular space, said filtering barrier including a perforated sleeve comprising a screen and said sealing means including a pair of cap members associated with the ends of said screen, each of said cap members including an annular rim for frictionally embracing the associated end of the screen.

6. In combination, a filter container, a cylindrical filtering barrier disposed within and spaced from the wall of said container, means for forcing liquid into said container and through said barrier, and means connected directly to the space between said barrier and said container and externally of said barrier for allowing air to escape from said container when the liquid is being forced therein, whereby the air pressure within said container may be controlled.

7. In combination, a filter container, a cylindrical filtering barrier in said container, means for supporting said barrier in said container in a position wherein it is spaced from the interior surface of the container, said container being spaced from said barrier by an annular space, an inlet connected to the interior of said barrier, means for forcing liquid through said inlet into said barrier and through the wall of said barrier into said annular space, an outlet connected to said annular space, and means connected directly to said annular space for relieving the container of the air pressure set up therein by the incoming liquid.

8. In combination, a filter container, a cylindrical filtering barrier disposed in said container, means for supporting said barrier in and for spacing it from said container, said barrier being spaced from the inner surface of said container by an annular space, an inlet connected to the interior of said filtering barrier, an outlet connected to said container and disposed in communication with said annular space, means for forcing liquid through said inlet into said barrier and through said barrier into said annular space, said filtering barrier offering resistance to the passage of liquid therethrough, whereby the pressure on the internal surface of the barrier is considerably greater than that existing in said annular space, said incoming liquid serving to compress the air in said container, whereby said compressed air can be subsequently utilized to cause all of the liquid to be drained from said container and air vent means connected to said annular space for controlling the air pressure in said container.

9. In combination, a filter container, a cylindrical filtering barrier disposed within and concentric to said container, a central rod extending through said barrier and said container disposed concentric with the axis of said container, mounting means connected to the ends of said filtering barrier slidably mounted on said central rod, means for supporting said rod in an inclined position so as to support the container in a slanting position and means for anchoring said rod to said container.

10. In combination, a filter container, a cylindrical filtering barrier disposed within said container, a central incline rod extending through said barrier and connected to said container, closure members for the ends of said filtering barrier slidably mounted upon said central rod whereby said container is supported in a slanting position, and means connected to said rod for rigidly clamping said filtering barrier in place in said container.

11. In combination, a filter container, a cylindrical filtering barrier disposed within said container, an inclined guide rod extending through said barrier and connected to said container for supporting the latter in a slanting position, closure members for the ends of said barrier slidably mounted on said guide rod, means for creating a seal between each of said closure members and the associated end of said barrier, clamping means mounted on said rod for rigidly clamping said barrier against longitudinal movement relative to said rod, said guide rod serving to facilitate the introduction of said barrier in said container and means for forcing liquid upwardly into said slanting container.

12. In combination, a filter container, a cylindrical filtering barrier disposed in said container, an inclined guide rod connected to an end of said container and extending through said barrier, means for clamping the barrier to said rod against longitudinal movement on the rod, a cover member on the upper end of said container, means connected to the other end of said rod for holding said cover member on said end of the container and inlet means connected to the lower end of said container.

13. In combination, a filter container, a cylindrical filtering barrier disposed in said container, a central inclined rod connected to said container and extending through said barrier for supporting them in a slanting position, said barrier being spaced from the inner surface of said container by an annular space, means for sealing the ends of said barrier from said annular space and for slidably mounting said barrier on said rod, and means for maintaining said barrier in a given position in said container and for preventing movement of said barrier axially of said rod.

14. In combination, a filter container, a cylindrical filtering barrier in said container, an inclined rod extending through said container and barrier for supporting them in a slanting position, means for securing one end of said rod to one end of said container comprising a pipe fitting secured to the associated end of the container, a closure member for the other end of said container, and means for holding said closure member on said end of the container secured to the other end of said rod.

15. In combination, a filter container, a filtering barrier disposed in said container, an inlet connected to the interior of said barrier, an outlet connected to a space between said barrier and said container and screening means connected to said inlet including a cup-like member having a cylindrical screen extending therein, a ring member secured to said screen and engaging a shoulder on the upper end of the cup member, and a clamping member for securing said ring member in place on said shoulder, whereby said screen is maintained in said cup member.

In testimony whereof I have hereunto subscribed my name at Chicago, Cook County, Illinois.

FRANK B. LOMAX.